US006584379B1

(12) United States Patent
Mukai et al.

(10) Patent No.: US 6,584,379 B1
(45) Date of Patent: Jun. 24, 2003

(54) ROBOT DEVICE AND METHOD OF ADJUSTING ORIGIN OF ROBOT

(75) Inventors: Yasushi Mukai, Osaka (JP); Masaya Hirayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/069,802

(22) PCT Filed: Jun. 26, 2000

(86) PCT No.: PCT/JP00/04161
§ 371 (c)(1),
(2), (4) Date: Jun. 27, 2002

(87) PCT Pub. No.: WO02/00399
PCT Pub. Date: Jan. 3, 2002

(51) Int. Cl.[7] ................................ G05B 19/04
(52) U.S. Cl. .................. 700/254; 700/156; 700/245; 700/251; 700/262; 336/130
(58) Field of Search ................. 700/156, 245, 700/251, 254, 262; 310/20, 12; 33/503; 336/130, 132, 134, 135; 72/10.4

(56) References Cited

U.S. PATENT DOCUMENTS

| | | | | |
|---|---|---|---|---|
| 4,580,224 A | * | 4/1986 | Gerber | 700/156 |
| 4,961,267 A | * | 10/1990 | Herzog | 33/503 |
| 5,279,778 A | * | 1/1994 | Taira et al. | 264/40.1 |
| 5,623,337 A | * | 4/1997 | Iori et al. | 356/153 |
| 5,828,909 A | * | 10/1998 | Kai et al. | 396/55 |
| 5,903,205 A | * | 5/1999 | Goto et al. | 336/130 |
| 6,081,050 A | * | 6/2000 | Hong et al. | 310/20 |

FOREIGN PATENT DOCUMENTS

| | | |
|---|---|---|
| JP | 63-8904 | 1/1988 |
| JP | 5-216514 | 8/1993 |
| JP | 5-318351 | 12/1993 |

OTHER PUBLICATIONS

Wang et al., Path error compensation of a two–link flexible robot arm based on integrated laser transducers, 1997, IEEE, pp. 3786–3790.*
M'Sirdi et al., Identification and control of pneumatic driven robot, 1993, IEEE, pp. 722–727.*
Townsend et al., Teloperator slave–WAM design methodology, 1999, Internet, pp. 167–177.*
International Search Report corresponding to application No. PCT/JP00/04161 dated Oct. 3, 2000.
English translation of form PCT/ISA/210.

* cited by examiner

Primary Examiner—William A. Cuchlinski, Jr.
Assistant Examiner—McDieunel Marc
(74) Attorney, Agent, or Firm—RatnerPrestia (57) ABSTRACT

In a robot machine having a plurality of rotational joint axes, a rotational angle of rotational joint axis and a tilt angle of robot arm against the direction of gravity are measured at three or more of rotational angle positions to obtain rotational angle information $\Theta i$ and tilt angle information $Y i$, and regression factors $\alpha$ and $\beta$ are derived by computation from a resulting regression function of $Y = \alpha \sin(\Theta + \beta) + \gamma$, thereby performing an original point adjustment of rotational joint axis based on the obtained tilt angle and tilt direction thereof.

8 Claims, 6 Drawing Sheets

ROBOT DEVICE AND METHOD OF ADJUSTING ORIGIN OF ROBOT

This application is a U.S. National Phase Application of PCT International Application PCT/JP00/04161.

TECHNICAL FIELD

The present invention relates to a robot machine and particularly relates to an origin point adjustment method thereof.

BACKGROUND ART

The instructing process of a prior art teaching playback type robot is performed while the robot being actually operated. Because of such an instructing method as above, a lot of teaching playback type robots have been widely used in the industry and the market thereof is still expanding. The operating accuracy of a teaching playback type robot is positional accuracy in reproducibility of a teaching point. Therefore, the individuality of each respective robot and absolute positional accuracy have not been considered important. The foregoing tendency is still prevailing.

In recent years, however, a demand for a reduction in teaching steps of teaching playback type robots has been growing and there are great expectations upon an off-line teaching process that allows the teaching process and performance simulation of robots to be taken place on a display with the use of a computer. By living up to the expectations, many off-line teaching systems have been introduced to the market and actually in use.

However, the positional difference existing between the structural model of a robot defined inside a computer and the actual robot in use becomes a serious cause of degrading the teaching accuracy involved. Therefore, it is necessary at present for a teaching program prepared by the use of an off-line teaching system to be corrected at worksite and actually many corrective teaching instructions are provided.

In addition to the positional accuracy, a high degree of accuracy has been required of an operating path when a CP(continuous path) operation is taking place.

In order to satisfy the foregoing requirement, considerable efforts have been put into enhancing the computing speed and accuracy of a robot controller and achieving a higher degree of accuracy in machining the respective mechanical parts that constitute robot arms. However, in the same way as in the case of off-line teaching, the positional difference existing between the structural model of a robot defined inside a robot controller and the actual robot has a great effect on the accuracy of an operating path. Therefore, market requirements with respect to operating path accuracy at the time of CP operation are not allowed to be satisfied sufficiently.

The positional difference between the structural model of a robot and an actual robot causes adverse effects on individuality, absolute positional accuracy and operating path accuracy of the robot.

The foregoing positional difference is caused by machining accuracy of arm length, twisting between axes and the like, assembly accuracy and shifting in position of the original point of rotational joint axis. Above all, the shifting in position of the original point of rotational joint axis has the greatest influence to cause the positional difference.

As the method of calibration is considered a method for applying a correction to a structural model by taking measurements of a positional difference between the structural model of a robot and an actual robot. This calibration method is being studied for calibration purposes of robots. A few different methods are proposed as the calibration method. However, since the measurement of the positional difference needs to be performed with an extremely high degree of accuracy, the method of measurement itself is difficult and requires very expensive measurement instruments. As a result, the method of applying calibration to a structural model has not so far prevailed in the industry. Therefore, the inventor of the present invention proposed a method of using a tilt angle sensor in the Japanese Patent Application Unexamined Publication No. H05-318351 as the method for facilitating automated measurement at a relatively low cost.

Figure 1:
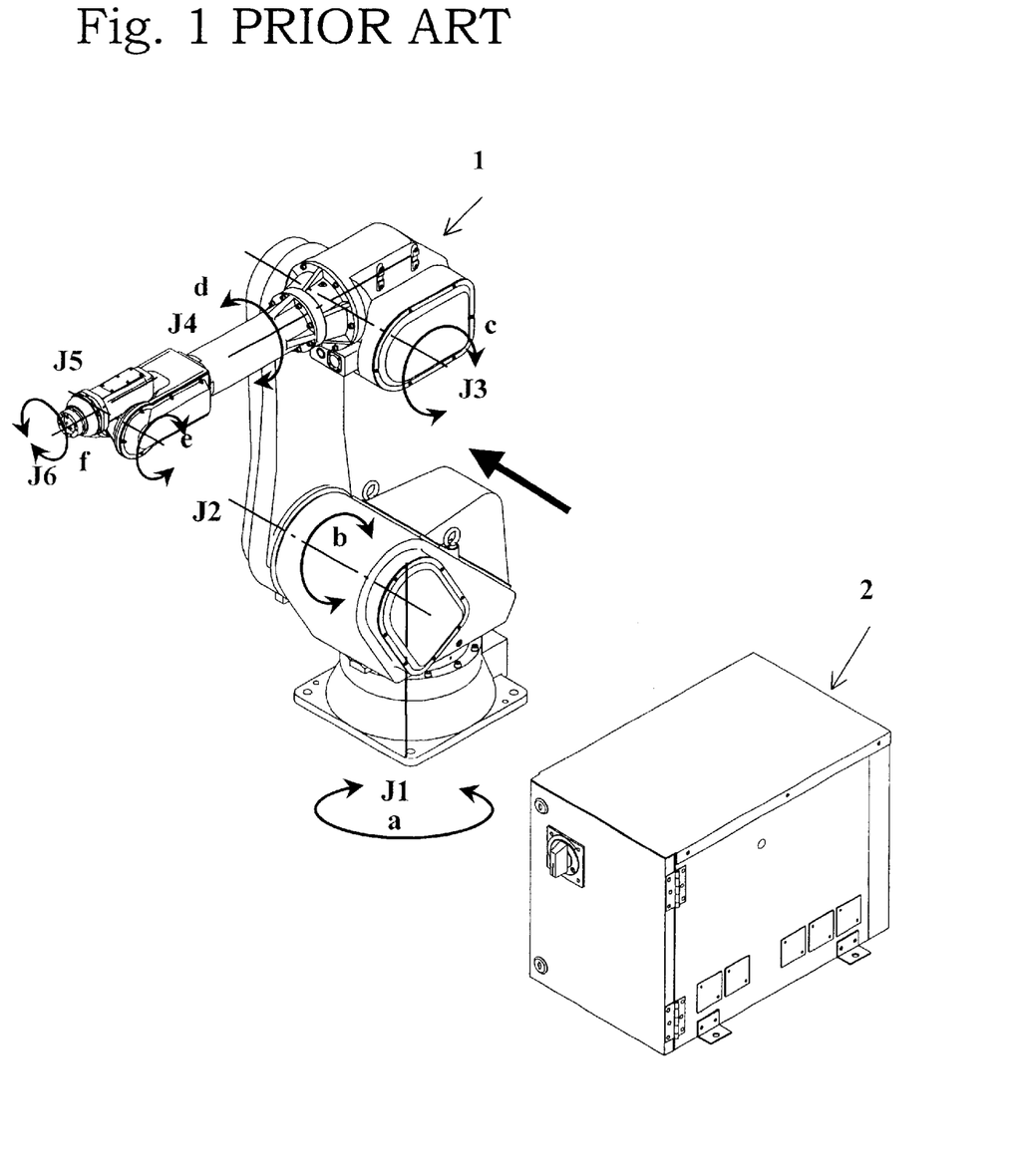
FIG. 1 is a perspective view of an example of robots that are adjusted in original point according to the present invention and according to prior art methods.
Figure 7:
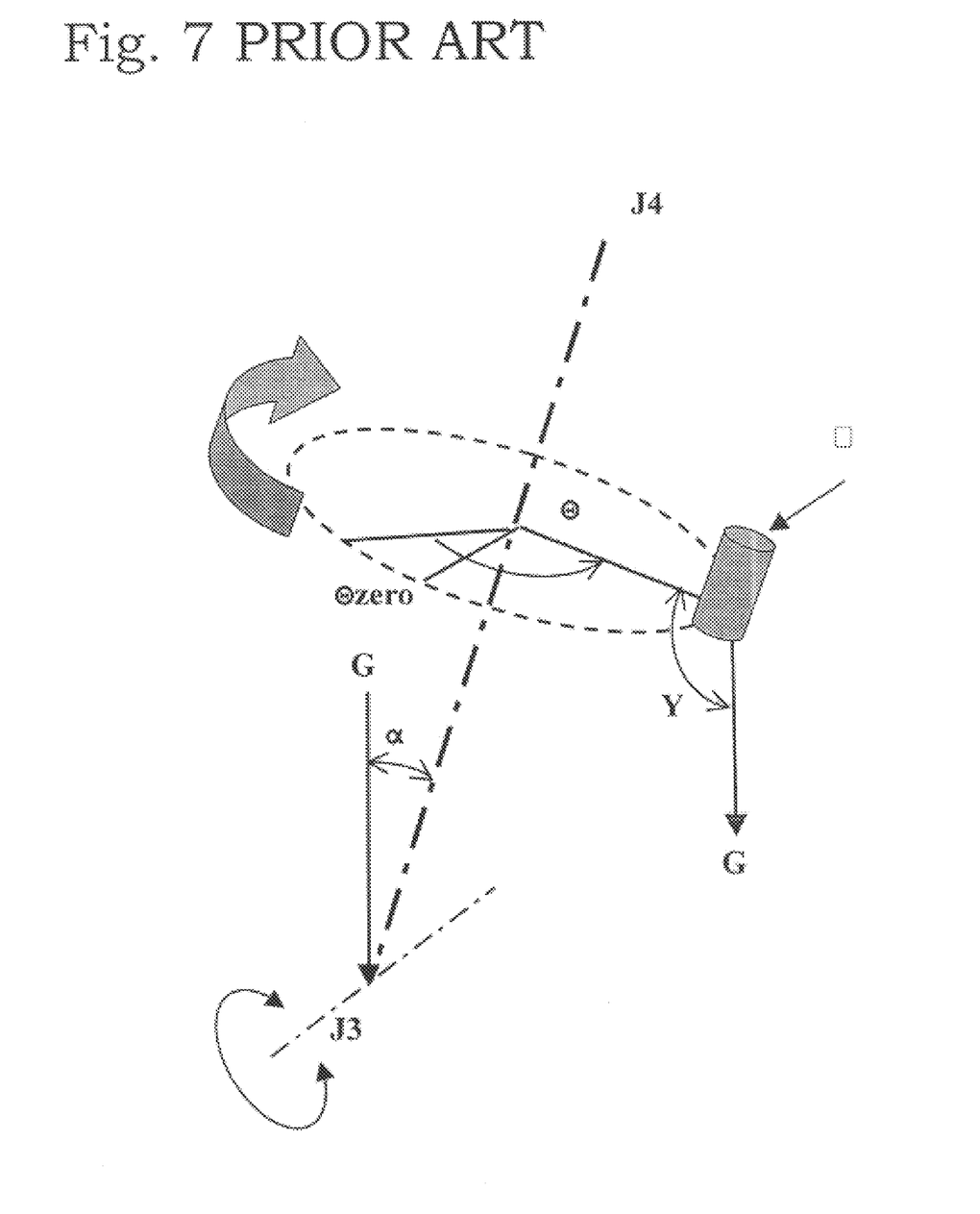
FIG. 7 is a conceptual illustration for describing the original point adjustment method of robots according to the present invention and also according to the prior art method.
Figure 8:
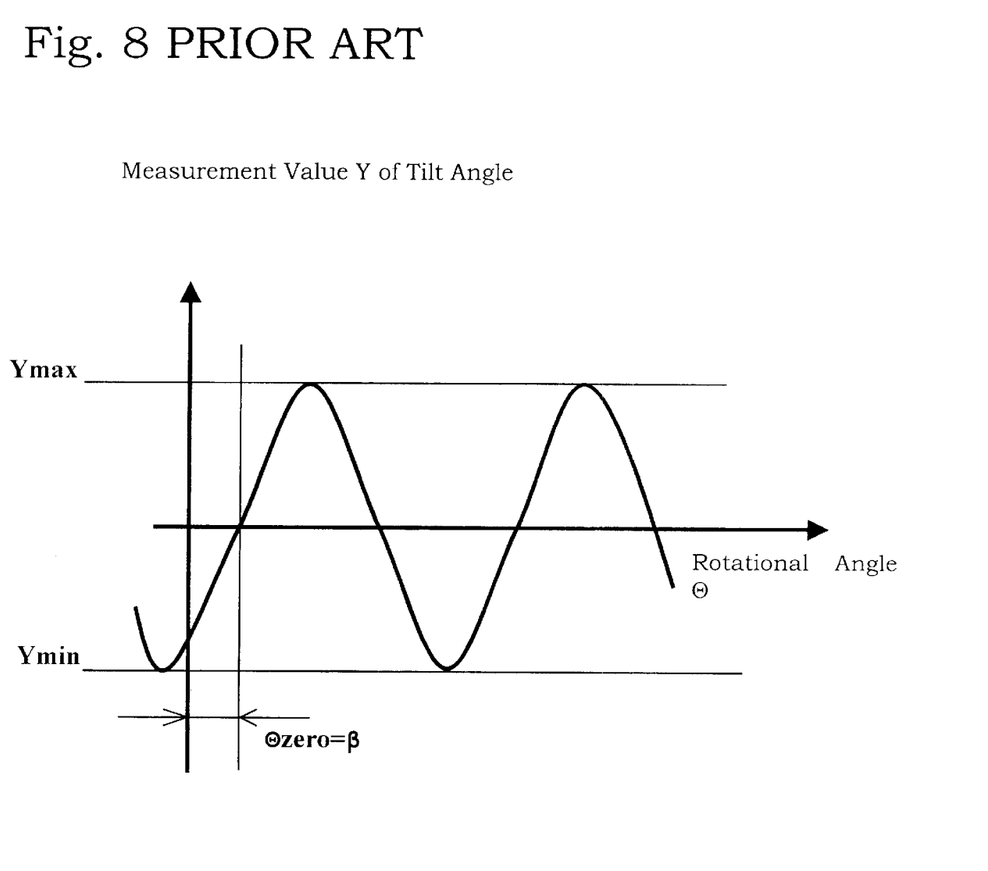
FIG. 8 is a diagram showing the relationship between rotational angle Θ and tilt angle Y measured according to the prior art original point adjustment method for robots.

Next, a brief description is given to a prior art method with reference to FIG. 1, FIG. 7 and FIG. 8. Particularly, FIG. 1 is used for guidance in order to make the description simple.

FIG. 1 is a perspective view of an example of the robots that are targeted for an origin point adjustment. Robot 1 in FIG. 1 comprises six rotational joint axes of first joint axis J1 to six joint axis J6. As FIG. 1 shows, respective joint axes J1 to J6 are allowed to be moved in rotational directions a to f by controller 2 that controls the motion of the robot.

FIG. 7 is a conceptual illustration of an original point adjustment method as employed in a prior art robot and shows in a schematic form third joint axis J3, fourth joint axis J4 and tilt angle sensor 3 mounted on the tip of robot arm for the robot as shown in FIG. 1, for example. As FIG. 7 shows, fourth joint axis J4 is tilting by angle α from direction G of gravity due to the rotation of third joint axis J3 that makes the center axis of rotation for fourth joint axis J4. Tilt angle sensor 3 is mounted on the tip of robot arm via fifth joint axis J5 and six joint axis J6. (Refer to FIG. 1.)

In the foregoing, the sensor mounting surface serving as a reference surface of detection for tilt angle sensor 3 is assumed to make a tilting angle of γ (not shown in FIG. 1) against fourth joint axis J4.

In addition, an encoder (not shown in FIG. 1) acting as means for measuring a rotational angle of joint axis is attached to each respective rotational joint axis.

With a robot that is structured as described in above, while fourth joint axis J4 being rotated by controller 2 (refer to FIG. 1), tilt angle γ and rotational angle Θ of joint axis are measured at predetermined rotational angle positions by tilt angle sensor 3 and the encoder, respectively.

FIG. 8 shows the relationship between rotational angle Θ of fourth joint axis J4 (the same Θ as shown in FIG. 7) and tilt angle Y measured according to the original point adjustment method as described in above. In FIG. 8, the maximum value of tilt angle Y is $Y_{max}$, the minimum value is $Y_{min}$ and, when tilt angle Y equals to the mean value of the maximum and minimum values thereof, a rotational angle of fourth joint axis J4 is defined as $\Theta_{zero}$.

As is evident from FIG. 7 and FIG. 8, tilt angle α of fourth joint axis J4 against direction G of gravity can be derived by calculation in such a way as dividing the difference between the maximum value $Y_{max}$ and minimum value $Y_{min}$ of the measured tilt angle Y by two. Further, the direction of tilt is allowed to be measured with reference to $\Theta_{zero}$.

Thus, the original point position of third joint axis J3 can be readily adjusted by the use of a value of tilt angle α of the rotational center of fourth joint axis J4 measured and derived by calculation as described in above. The foregoing adjustment method can be applied to other axes equally well.

As described in above, according to the prior art original point adjustment method, tilt angle α of a rotational joint axis against direction G of gravity can be derived from the difference between the maximum and minimum values of tilt angle Y. On the other hand, since tilt angle α is not affected by mounting angle γ of tilt angle sensor 3, an adjustment with a high degree of accuracy is made possible without being affected by machining accuracy and the like of the reference surface for mounting the sensor.

In addition, as described in above, mounting angle γ of tilt angle sensor 3 does not have any influence with respect to measurement, thereby allowing the original point position of each respective joint axis to be adjusted in succession as the attitude of robot 1 is being changed as appropriate. Therefore, once a single sensor is attached to the tip of robot arm, adjustments of a plurality of joint axes are made possible by having a rotational angle of each respective joint axis of robot positioned appropriately, thereby allowing even automated adjustment steps to be realized without difficulty.

However, the prior art method has had the following two flaws. Firstly, tilt angle Y and rotational angle Θ are measured continuously and it is needed to find out precisely at what positions of rotational angle tilt angle Y falls on maximum value $Y_{max}$ and minimum value $Y_{min}$. In order to measure the maximum value $Y_{max}$ and minimum value $Y_{min}$ of tilt angle Y, it is necessary for rotational angle Θ to be rotated by more than 180° at least. However, when there is not much extra room for the place where a robot is installed, rotational angle Θ is sometimes not allowed to be rotated by more than 180°, thus bringing about the situation where carrying out a measurement itself is difficult.

Secondly, the prior art method has another flaw in that the original point adjustment of an "n"th joint axis is performed by the use of a tilt angle of rotational center axis of an "n+1"th joint axis. As observed with second joint axis J2 of robot in FIG. 1, for example, when parallelism with a rotational joint axis adjoining thereto, i.e., third joint axis J3 is mutually maintained, the prior art method does not allow the adjustment of second joint axis J2 to be performed, thereby requiring the adoption of a different method to carry out the adjustment.

SUMMARY OF THE INVENTION

The present invention deals with the foregoing problems and provides a method of original point adjustment whereby a high accuracy adjustment can be performed even if the room where a robot is allowed to move is limited in space and also an adjustment can be carried out even if joint axes are located in such a way as adjoining rotational joint axes are parallel with one another.

In order to solve the foregoing problems, the present invention proposes with respect to rotational joint axes of a robot machine having a plurality of rotational joint axes, in which adjoining rotational joint axes are not parallel with one another, a method of original point adjustment comprising the steps of:

measuring a rotational angle of rotational joint axis and a tilt angle of robot arm against the direction of gravity at three points or more of rotational angle position at least;

deriving by computation regression factors α and β based on a regression function of Y=α SIN(Θ+β)+γ formed of thus obtained rotational angle information Θi and tilt angle information Yi ; and performing an original point adjustment based on the obtained tilt angle and tilt direction of rotational joint axis.

BEST MODE FOR CARRYING OUT THE INVENTION

Figure 2:
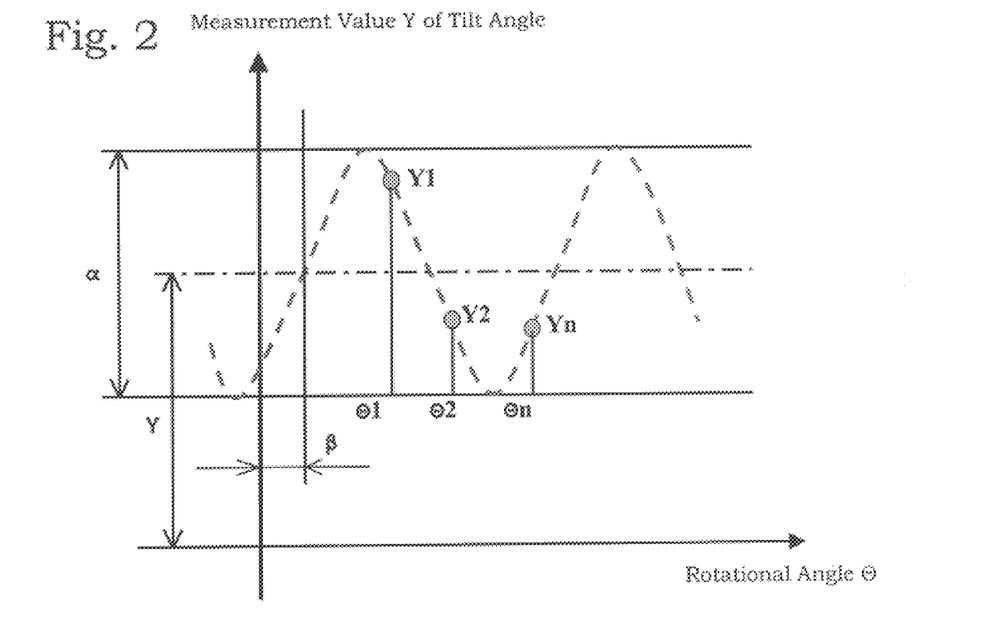
FIG. 2 is a diagram showing the relationship between rotational angle Θi and tilt angle Yi measured according to the original point adjustment method of the present invention.

Next, a description is given to an exemplary embodiment of the present invention with reference to FIG. 1, FIG. 2 and FIG. 7.

FIG. 1 is a perspective view of one example of robot that is subjected to an original point adjustment, FIG. 2 is a diagram showing the relationship between rotational angle Θi and tilt angle Yi and FIG. 7 is a conceptual illustration for describing an original point adjustment method.

Robot 1 shown in FIG. 1 comprises six rotational joint axes of first joint axis J1 to sixth joint axis J6. With this robot, adjoining second joint axis J2 and third joint axis J3 are parallel with each other in position and other adjoining joint axes are arranged in position perpendicular to one un another.

Respective joint axes J1 to J6 are rotated in respective directions a to f by controller 2 which acts as a control means for the robot.

An encoder (not shown in the drawing) acting as a rotational angle measurement means is attached to each respective joint axis to measure a rotational angle thereof. In addition, each respective joint axis is provided with an original point position (not shown in the drawing) which is used as the reference position of motion for each respective joint axis.

Furthermore, a tilt angle sensor (not shown in the drawing) is attached to the tip of robot arm to measure a tilt angle of the robot arm's tip against the direction of gravity.

In order to have the robot structured as described in above put into motion accurately as intended for according to the program involved, it is necessary for the original point position of each respective rotational axis to be aligned accurately as described in the foregoing.

Next, a description is given to an adjustment method of the original point position of third joint axis J3 by putting fourth joint axis J4 into motion in the same way as in the prior art example.

A conceptual illustration of the relationships existing among third joint axis J3, fourth joint axis J4 and tilt angle sensor 3 that are directly related with the original point adjustment method of the present invention results in FIG. 7.

Further, the surface, on which a tilt angle sensor is mounted, acts as the tilt angle detection reference plane and is assumed to be tilting by angle γ (not shown in the drawing) against fourth joint axis J4.

In order to derive by computation the amount of shifting in the original point position, fourth joint axis J4 is rotated, thereby picking up at least three or more of different rotational angle positions for position setting.

For each respective rotational angle position, tilt angle Yi against the direction of gravity and rotational angle Θi of fourth joint axis J4 are measured, where the subscript i stands for an "i"th measurement datum.

Measured tilt angle Yi and rotational angle Θi are fed into a computation it for deriving original point calibration magnitude (not shown in the drawing), and a tilt angle and a tilt direction for a rotational joint axis in question are derived by computation according to the steps described below.

FIG. 2 is a graph plotting the measured Θi and Yi, where the horizontal axis indicates rotational angle Θ and the vertical axis indicates tilt angle Y. As clearly seen according to the principle involved, the relationship between Θi and Yi is expressed by a SIN function as shown by a broken line in FIG. 2.

Here, a regression function (1) is established as below, thereby deriving regression factors α, β and γ.

$$Y = \alpha \, \text{SIN}(\Theta + \beta) + \gamma \quad (1)$$

Then, the regression function (1) is deformed by linearization to obtain an equation (2).

$$Y = A \, \text{SIN}(X) + B \, \text{COS}(X) + C \quad (2)$$

where A, B and C are defined as follows:

$$A = \alpha \, \text{COS}(\beta), \; B = \alpha \, \text{SIN}(\beta), \; C = \gamma \quad (3)$$

A squared sum E of errors is obtained based on the equation (2) and data Xi and Yi, thereby establishing an equation(4) as follows:

$$E = \Sigma \delta i^2 = \Sigma (Yi - C - A \, \text{SIN}(Xi) - B \, \text{SIN}(Xi))^2 \quad (4)$$

By applying partial differential to A, B and C in the equation (4) and making E=0, respectively, equations (5), (6) and (7) are obtained as follows:

$$0 = \Delta E/\Delta C = \Sigma Yi - nC - \Sigma \, \text{SIN}(X)A - \Sigma \, \text{COS}(Xi)B \quad (5)$$

$$0 = \Delta E/\Delta A = \Sigma Yi \, \text{SIN}(Xi) - \Sigma \, \text{SIN}(Xi)C - \Sigma \, \text{SIN}^2(Xi)A - \Sigma \, \text{SIN}(Xi)\text{COS}(Xi)B \quad (6)$$

$$0 = \Delta E/\Delta B = \Sigma Yi \, \text{COS}(Xi) - \Sigma \, \text{COS}(Xi)C - \Sigma \, \text{SIN}(Xi)\text{COS}(Xi)A - \Sigma \text{COS}^2(Xi)B \quad (7)$$

By applying an arrangement to factors in the equations (5), (6) and (7), a system of simultaneous equations is established as follows:

$$\begin{pmatrix} a11 & a12 & a13 \\ a21 & a22 & a23 \\ a31 & a31 & a33 \end{pmatrix} \cdot \begin{pmatrix} A \\ B \\ C \end{pmatrix} = \begin{pmatrix} b1 \\ b2 \\ b3 \end{pmatrix} \quad (8)$$

where respective factors are defined as in the following:

$$\begin{aligned} a11 &= n & a12 &= \sum \text{SIN}(Xi) & a13 &= \sum \text{COS}(Xi) \\ a21 &= \sum \text{SIN}(Xi) & a22 &= \sum \text{SIN}^2(Xi) & a23 &= \sum \text{SIN}(Xi)\text{COS}(Xi) \\ a31 &= \sum \text{COS}(Xi) & a32 &= \sum \text{SIN}(Xi)\text{COS}(Xi) & a33 &= \sum \text{COS}^2(Xi) \\ b1 &= \sum Yi & b2 &= \sum Yi\text{SIN}(Xi) & b3 &= \sum Yi\text{COS}(Xi) \end{aligned} \quad (9)$$

A solution of the system of simultaneous equations (8) is as follows:

$$C = \frac{\begin{vmatrix} b1 & a12 & a13 \\ b2 & a22 & a23 \\ b3 & a32 & a33 \end{vmatrix}}{|D|} \quad (10)$$

$$A = \frac{\begin{vmatrix} a11 & b1 & a13 \\ a21 & b2 & a23 \\ a31 & b2 & a33 \end{vmatrix}}{|D|} \quad (11)$$

$$B = \frac{\begin{vmatrix} a11 & a12 & b1 \\ a21 & a22 & b2 \\ a31 & a32 & b3 \end{vmatrix}}{|D|} \quad (12)$$

$$|D| = \begin{vmatrix} b1 & a12 & a13 \\ b2 & a22 & a23 \\ b3 & a32 & a33 \end{vmatrix} \quad (13)$$

Since A, B and C are defined as in the equation (3), what follows is obtained from the equations (10) to (13).

Offset: γ=C

Tilt Direction (Phase): $\beta = \text{TAN}^{-1}(B/A)$ (14)

Tilt Angle (Amplitude): $\alpha = A/\text{COS}(\beta)$

In FIG. 2, 2α is the amplitude of the SIN function and equals to the difference between maximum value $Y_{max}$ and minimum value $Y_{min}$ of tilt angle Y in the prior art example. β becomes the same as tilt direction Θ zero in the prior art example. In the same way as in the prior art example, γ is the mounting angle of tilt sensor 3.

Thus, tilt angle α and tilt direction β of fourth joint axis J4 against direction G of gravity can be obtained.

In addition, according to the original point adjustment method of the present invention, there is no specific restriction imposed on the rotational angle position of fourth joint axis J4 for the sake of measurement, thereby allowing the range of rotational angle to be limited to less than 180°.

Thus, by performing measurement data processing according to a statistical method, the tilt angle and tilt direction of a rotational axis are allowed to be derived by computation accurately by a measurement made on a small number of measurement points. More specifically, a measurement is carried out by a robot that is limited in motion to a small extent (i.e., installed in confined spaces) to allow the tilt angle and tilt direction of a rotational axis to be obtained by computation accurately. Therefore, the original point adjustment method of the present invention can contribute to a remarkable improvement of the shortcomings involved with prior art examples.

Next, a description is given to the case, where the rotational joint axis subjected to adjustment is parallel to a rotational joint axis located adjacent thereto, with reference to FIG. 3 to FIG. 6.

Figure 3:
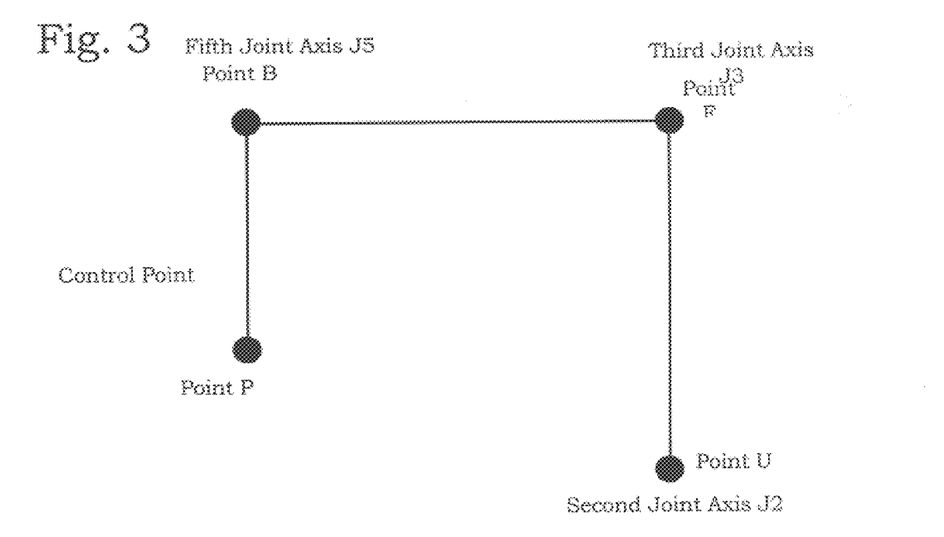
FIG. 3 is a side view of the skeletal model of a robot adjusted in original point according to the present invention, looked from the direction indicated by arrow A in FIG. 1.

FIG. 3 is a side view of the skeletal model of the robot of FIG. 1, looked from the direction indicated by arrow A in FIG. 1. Point U in FIG. 3 is the axis center of second joint axis J2 and point F is the axis center of third joint axis J3. Point B is the axis center of fifth joint axis J5 and point P is the tip of a jig (not shown in the drawing) attached to the end of the robot. This point P serves as the control point of the robot.

First joint axis J1, fourth joint axis J4 and sixth joint axis J6 are not shown in the drawing since these axes are not directly involved with the present description.

Axis centers of respective joint axes J2, J3 and J5 are adjusted in position so as to be made perpendicular to the surface of the drawing.

With respect to second joint axis J2 and fifth joint axis J5, adjustments of the original point angles are performed in advance according to the method of the present invention.

Accordingly, the respective robots shown in FIG. 3 to FIG. 6 move on the plane coinciding with the surface of each respective drawing.

Figure 4:
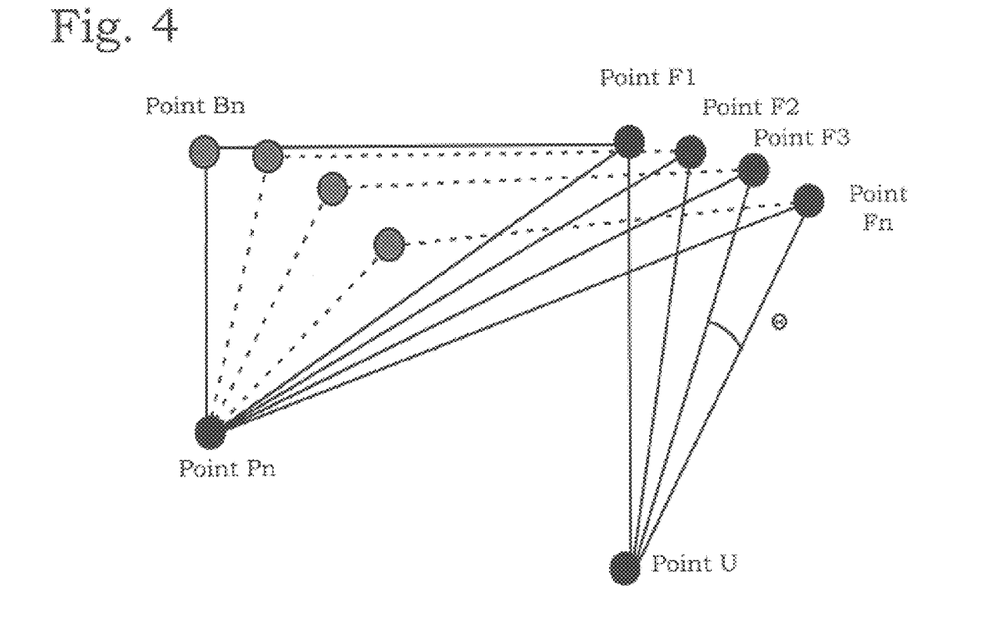
FIG. 4 is a diagram of the case where a pivotal motion takes place with the control point of the skeletal model of FIG. 3 fixed to one point.

When so-called pivot motion takes place under the state where the position of point P in terms of control computation is fixed to one point by determining the angles of motion of third joint axis J3 and fifth joint axis J5 so as to have the angle of second joint axis J2 moved by an increment of $\Theta$ degrees, the skeletal model of robot assumes the movement traces as FIG. 4 shows. The points corresponding to the respective angles of motion of second joint axis J2 are indicated by P1 ... Pn, B1 ... Bn and F1 ... Fn.

Here, when the length of each respective arm is supposed to be correct, vector PnFn (hereafter, vector PnFn is expressed as PnFn) also turns out correct against the space (the direction of gravity). In order to make the description simpler, point B is neglected, and PnFn and UFn are taken into consideration.

Figure 5:
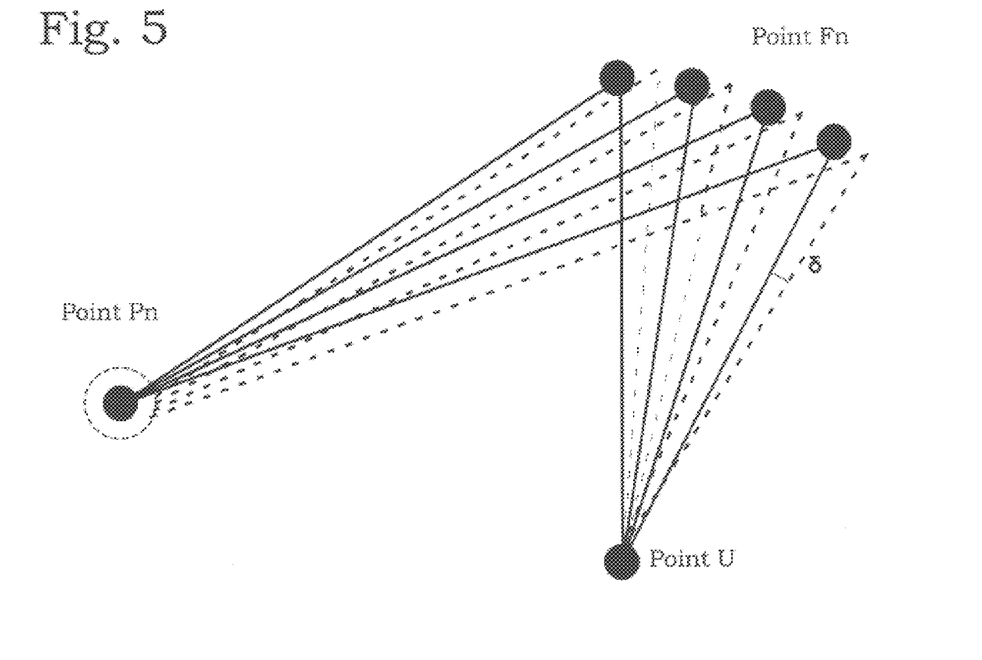
FIG. 5 is a diagram of the case where second joint axis J2 of FIG. 4 is shifted from an ideal angle by δ.

When second joint axis J2 serving as an object to receive an original point adjustment is shifted from an ideal angle by $\delta$, the foregoing pivot motion results in the broken lines as shown in FIG. 5. Point P serving as a control point is not allowed to stay at one point and traces a circular arc pattern.

Figure 6:
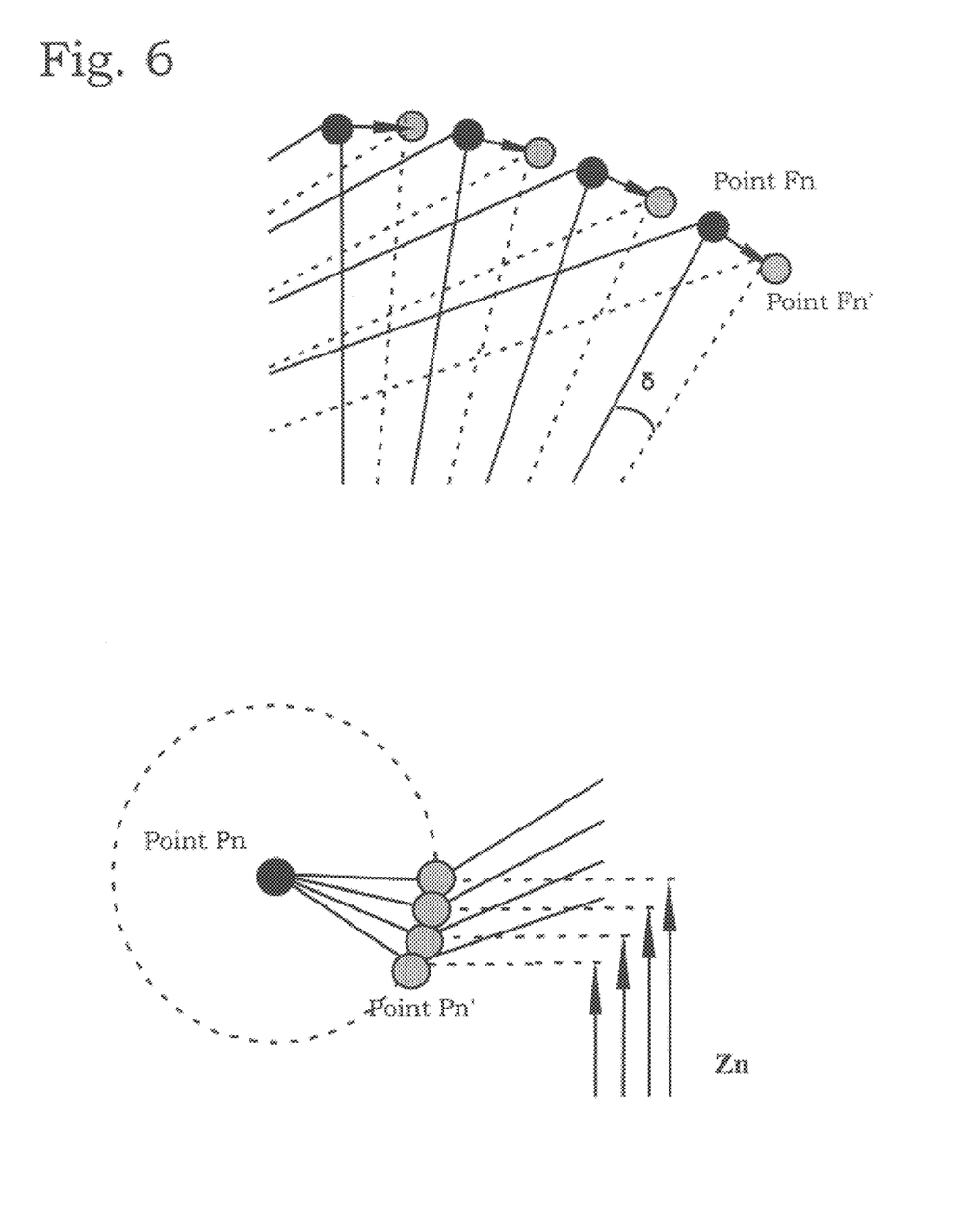
FIG. 6 is a partially enlarged view of FIG. 5.

FIG. 6 is an enlarged view of FIG. 5 in the vicinity of point Pn and also point Fn.

Suppose that point P and point F are shifted from the ideal positions thereof to point Pn' and point Fn', respectively, due to the adverse effect of error $\delta$ of second joint axis J2, then the following equation (15) is established.

$$PnPn'=FnFn' \quad (15)$$

Here, distance Zn between an arbitrary reference line within the plane of motion and shifted point Pn' is measured by a distance measurement means. When distance Zn is expressed by the use of the length of vector PnPn' that is made as |PnPn'| (the same hereafter), an equation (16) is established.

$$Zn=|PnPn'| \cdot SIN(\Theta n+\eta)+Z_0 \quad (16)$$

The equation (16) is the same as the equation (1) except for having $\alpha$ replaced with |PnPn'|, $\beta$ with $\eta$, $\gamma$ with $Z_0$ and Y with Zn.

As a result, by the use of measured distance Zn and rotational angle $\Theta$, regression factors can be derived from the foregoing regression function (1) according to the same statistical processing.

In addition, from the equation of PnPn'=FnFn', an equation of $$\delta=2\ SIN^{-1}(|PnPn'|/2L)$$

is derived, where L is an arm length of the second arm, thereby allowing angle error $\delta$ of second joint axis J2 to be obtained readily, which has been impossible to be obtained otherwise.

Although a description is made with a tilt angle sensor used as the tilt angle measurement means to measure a tilt angle against the direction of gravity, other means such as a level, an acceleration sensor, a gyro-compass, (or an angular velocity sensor) and the like are allowed to be used for the same effect.

Furthermore, it is obvious that the distance measurement means to measure the distance between an arbitrary straight line within the plane of motion and a control point can be mounted on a robot arm or disposed on the aribitrary straight line within the plane of motion for the same effect.

INDUSTRIAL APPLICABILITY

As described in above, on top of exploiting the features of a prior art method, the present invention is allowed to be used not only in such problem areas as a restriction being imposed on the extent of movement for a robot and an inability to use the method of the present invention in an axis structure, where the rotational joint axis serving as an object to be adjusted is parallel with a rotational joint axis adjoining thereto, but also to conduct a high accuracy adjustment by processing measurement data according to a statistical method, thereby realizing a method of automating an original point adjustment relatively at a low cost and also with relative ease.

What is claimed is:

1. With a rotational joint axis of a robot machine having a plurality of rotational joint axes, said rotational joint axis not maintaining a mutually parallel relationship with an adjoining rotational joint axis, an original point adjustment method of robot comprising the steps of:

measuring a rotational angle of said rotational joint axis and a tilt angle of a robot arm against a direction of gravity at three points at least or more of rotational angle positions;

deriving by computation regression factors $\alpha$ and $\beta$ based on a regression function of Y=$\alpha$ SIN($\Theta$+$\beta$)+$\gamma$ formed of thus obtained rotational angle information $\Theta$i and tilt angle information Yi; and performing an original point adjustment of said rotational joint axis based on a tilt angle and a tilt direction of rotational joint axis derived by computation from said regression factors.

2. The original point adjustment method of robot according to claim 1, wherein a range of rotational angle of a rotational joint axis to be moved rotationally is limited to less than 180°.

3. With a rotational joint axis having a mutually parallel relationship with an adjoining rotational joint axis, an original point adjustment method of robot comprising the steps of:

measuring distance Z between a control point of robot and an arbitrary straight line within a plane having a rotational joint axis serving as an object to receive adjustment made perpendicular thereto;

measuring simultaneously a distance between said straight line and control point of robot and a rotation angle of said rotational joint axis serving as an object to receive adjustment while an attitude of robot being changed within said plane with a position of control point of said robot defined according to control computation kept to a fixed position; and performing an original point adjustment of said rotational joint axis serving as an object to receive adjustment by obtaining an amount of shift in angle of said rotational joint axis serving as an object to receive adjustment from an ideal value from the obtained distance information and rotational angle information.

4. The original point adjustment method of robot according to claim 3, further comprising the steps of:

measuring distance information Zi and rotational angle information Θi of a rotational joint axis at three points at least or more in attitude;

deriving by computation a regression factor $\alpha$ from a regression function of $Z = \alpha \, SIN(\Theta + \beta) + \gamma$; and performing an original point adjustment of said rotational joint axis serving as an object to receive adjustment by obtaining an amount of shift in angle of rotational joint axis from an ideal value.

5. With a rotational joint axis of robot machine having a plurality of rotational joint axes, said rotational joint axis not maintaining a mutually parallel relationship with an adjoining rotational joint axis, a robot machine comprising:

a tilt angle measurement means fixed on a robot arm to measure a tilt angle against a direction of gravity;

a robot control means to make a positional determination of said rotational joint axis at a plurality of designated rotational angle positions;

a rotational angle measurement means to measure a rotational angle of said rotational joint axis; and an original point calibration amount computation means, wherein said rotational joint axis is determined in position at three or more of different rotational angle positions at least by said robot control means;

rotational angle Θi and tilt angle Yi are measured at said each respective rotational angle position;

regression factors $\alpha$ and $\beta$ are obtained by computation from a regression function of $Y = \alpha \, SIN(\Theta + \beta) + \gamma$; and tilt angle information and tilt direction information of said rotational joint axis against a direction of gravity are derived by computation.

6. The robot machine according to claim 5, wherein a positioning range of said rotational angle of rotational joint axis for measurement is less than 180°.

7. With a rotational joint axis of robot machine having a plurality of rotational joint axes, said rotational joint axis maintaining a mutually parallel relationship with an adjoining rotational joint axis, a robot machine comprising:

a distance measurement means to measure distance Z between a control point of robot and an arbitrary straight line within a plane having a rotational joint axis serving as an object to receive adjustment made perpendicular thereto;

a robot control means to make a positional determination of said rotational joint axis at a plurality of designated rotational angle positions;

a rotational angle measurement means to measure a rotational angle of said rotational joint axis; and an original point shift amount computation means, wherein an attitude of said robot machine is changed within said plane by said robot control means while a control computational position of robot machine's control point being kept to a fixed position;

distance Zi between said straight line and robot's control point and a rotational angle of said rotational joint axis serving as an object to receive adjustment are measured simultaneously at said each respective position in attitude; and an angular shift amount of said rotational joint axis serving as an object to receive adjustment from an ideal value is derived by computation based on obtained distance information and rotational angle information.

8. The robot machine according to claim 7, further comprising an original point shift amount computation means, wherein said robot machine is determined in position within said plane to at least three or more different points of attitude by said robot control means while a control computational position of robot machine's control point being kept to a fixed position;

rotational angle information Θi of rotational joint axis and distance information Zi are measured at said each respective position of attitude; and regression factor $\alpha$ is obtained by computation from a regression function of $Z = \alpha \, SIN(\Theta + \beta) + \gamma$, thereby deriving an angular shift amount of said rotational joint axis serving as an object to receive adjustment from an ideal value.

* * * * *